United States Patent
Callaway et al.

(10) Patent No.: US 12,182,865 B2
(45) Date of Patent: *Dec. 31, 2024

(54) EXCHANGE FEED FOR TRADE REPORTING HAVING REDUCED REDUNDANCY

(71) Applicant: Chicago Mercantile Exchange Inc., Chicago, IL (US)

(72) Inventors: Paul Callaway, Chicago, IL (US); Fritz Caskey, Glenview, IL (US); Dennis Genetski, Valparaiso, IN (US); Pearce Peck-Walden, Chicago, IL (US); José Antonio Acuña-Rohter, Des Plaines, IL (US); Priteshkumar Soni, Naperville, IL (US); Rosa Frenkel, Buffalo Grove, IL (US)

(73) Assignee: Chicago Mercantile Exchange Inc., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/495,198

(22) Filed: Oct. 26, 2023

(65) Prior Publication Data

US 2024/0127340 A1    Apr. 18, 2024

Related U.S. Application Data

(63) Continuation of application No. 17/679,651, filed on Feb. 24, 2022, now Pat. No. 11,842,397, which is a
(Continued)

(51) Int. Cl.
*G06Q 40/04* (2012.01)
*G06F 21/62* (2013.01)

(52) U.S. Cl.
CPC ................... *G06Q 40/04* (2013.01)

(58) Field of Classification Search
None
See application file for complete search history.

(56) References Cited

U.S. PATENT DOCUMENTS

| 5,802,499 A | 9/1998 | Sampson et al. |
| 6,850,907 B2 | 2/2005 | Lutnick et al. |
| (Continued) | | |

FOREIGN PATENT DOCUMENTS

| EP | 1225717 A2 | 7/2002 |
| EP | 2851862 A1 | 3/2015 |

OTHER PUBLICATIONS

Extended European Search Report in EP Application No. 13749436. 5, dated Sep. 18, 2015, 7 pages.
(Continued)

*Primary Examiner* — Joseph W. King
(74) *Attorney, Agent, or Firm* — Lempia Summerfield Katz LLC

(57) ABSTRACT

The disclosed embodiments relate to communication of messages from a database to participants whereby messages, or at least a portion of the content thereof, indicative of changes in the database, due to one or more transactions between two or more participants, are structured so as to reduce redundant data therein and prioritize the transmission of that portion of the message which summarizes the event and result thereof. Further, these event reporting messages may further consolidate, or otherwise be combined with, the corresponding directed reporting messages communicated to the particular participants participating in the reported transaction while preserving the anonymity of those participants to which messages are particularly directed.

20 Claims, 7 Drawing Sheets

Related U.S. Application Data continuation of application No. 17/015,219, filed on Sep. 9, 2020, now Pat. No. 11,295,386, which is a continuation of application No. 15/992,462, filed on May 30, 2018, now Pat. No. 10,803,521, which is a continuation of application No. 15/617,473, filed on Jun. 8, 2017, now Pat. No. 10,032,221, which is a continuation of application No. 14/100,788, filed on Dec. 9, 2013, now Pat. No. 9,697,569.

(56) References Cited

U.S. PATENT DOCUMENTS

| | | |
|---|---|---|
| 7,389,422 B2 | 6/2008 | Banerjee et al. |
| 7,426,721 B1 | 9/2008 | Saulpaugh et al. |
| 8,184,805 B2 | 5/2012 | Yokota et al. |
| 8,296,217 B1 | 10/2012 | Howorka |
| 8,447,967 B1 | 5/2013 | Janacek et al. |
| 9,565,159 B2 * | 2/2017 | Shukla ............... H04L 61/5038 |
| 2002/0097878 A1 | 7/2002 | Ito et al. |
| 2002/0128945 A1 | 9/2002 | Moss et al. |
| 2002/0161994 A1 | 10/2002 | Cromer et al. |
| 2002/0169706 A1 | 11/2002 | Chandra et al. |
| 2008/0005571 A1 | 1/2008 | Moskowitz |
| 2009/0063360 A1 | 3/2009 | Callaway et al. |
| 2010/0094745 A1 | 4/2010 | Peterffy |
| 2010/0268633 A1 | 10/2010 | Rosenthal |
| 2011/0071958 A1 | 3/2011 | Grody et al. |
| 2011/0119176 A1 | 5/2011 | Hanson et al. |
| 2012/0022994 A1 | 1/2012 | Conary et al. |
| 2012/0221462 A1 | 8/2012 | De Verdier |
| 2012/0246055 A1 | 9/2012 | Schlifstein et al. |
| 2012/0250865 A1 | 10/2012 | Terpstra et al. |
| 2012/0254008 A1 | 10/2012 | Brady |
| 2013/0218739 A1 | 8/2013 | Kmiec et al. |
| 2013/0246369 A1 | 9/2013 | Skvirski |
| 2014/0143121 A1 | 5/2014 | Stevens |
| 2015/0088720 A1 | 3/2015 | Acuña-rohter |
| 2015/0088723 A1 | 3/2015 | Acuna-Rohter et al. |

OTHER PUBLICATIONS

Extended European Search Report in EP Application No. 14186095. 7, dated Jan. 29, 2015, 8 pages.

Extended European Search Report in EP Application No. 14869685. 9, dated Apr. 3, 2017, 10 pages.

Extended European Search Report, from EP Application No. 14869744. 4, Jun. 28, 2017, EP.

International Preliminary Report on Patentability in PCT Application No. PCT/US2013/025665, Aug. 19, 2014, 9 pages.

International Search Report and Written Opinion from PCT/US13/25665 dated Mar. 14, 2013.

International Search Report and Written Opinion in PCT Application No. PCT/US2014/068710, dated Mar. 12, 2015, 7 pages.

International Search Report and Written Opinion, from PCT/US2014/068749, Mar. 4, 2015, WO.

Zhao et al., "Applications of ENCODE data to systematic analyses via data integration", Current Opinion in Systems Biology, 2018, pp. 57-64, vol. 11.

* cited by examiner

FIG. 6

| Root (15) | | Repeating Group #1 – (23) #2 – (12) | | Description |
|---|---|---|---|---|
| Field (Tag) | Length | Field (Tag) | Length | |
| Msg Type | 0 | | | |
| Transact Time | 8 | | | |
| Match Event Indicator | 1 | | | |
| No MD Entries (1) | 3 | | | |
| | | MD Update Action | 0 | |
| | | MD Entry Type | 0 | |
| | | Security ID | 4 | |
| | | Rpt Seq | 4 | |
| | | MD Entry Px | 8 | |
| | | ConsTradeQty | 4 | Aggregate Quantity at price. |
| | | NumberOfOrders | 2 | Appearance in lower group. This corresponds to what we currently send in tag 346 – "Number of real orders per instrument that participated in the trade". |
| | | Aggressor Side | 1 | |
| No OrderIDEntries (2) | 3 | | | |
| | | Order ID | 8 | |
| | | MD Entry Size | 4 | |

{602} = Msg Type through No MD Entries
{604} = MD Update Action through Aggressor Side
{606} = No OrderIDEntries through MD Entry Size

EXCHANGE FEED FOR TRADE REPORTING HAVING REDUCED REDUNDANCY

REFERENCE TO RELATED APPLICATIONS

This application is a continuation under 37 C.F.R. § 1.53 (b) of U.S. patent application Ser. No. 17/679,651 filed Feb. 24, 2022 now U.S. Pat. No. 11,842,397, which a continuation under 37 C.F.R. § 1.53 (b) of U.S. patent application Ser. No. 17/015,219 filed Sep. 9, 2020 now U.S. Pat. No. 11,295,386, which is a continuation of U.S. patent application Ser. No. 15/992,462 filed May 30, 2018 now U.S. Pat. No. 10,803,521, which is a continuation of U.S. patent application Ser. No. 15/617,473 filed Jun. 8, 2017 now U.S. Pat. No. 10,032,221 which is a continuation of U.S. patent application Ser. No. 14/100,788 filed Dec. 9, 2013 now U.S. Pat. No. 9,697,569, the entire disclosures of which are incorporated by reference in their entirety.

U.S. patent application Ser. No. 14/100,788 is related to U.S. patent application Ser. No. 13/399,364 filed Feb. 17, 2012 published as U.S. Patent Application Publication No. 2013/0218739 A1, U.S. patent application Ser. No. 14/034,742 filed Sep. 24, 2013 published as U.S. Patent Application Publication No. 2015/0088720 A1, and U.S. patent application Ser. No. 14/100,887, entitled "SECURE EXCHANGE FEED MARKET DATA EMBARGO", filed contemporaneously herewith published as U.S. Patent Application Publication No. 2015/0088723 A1, the entire disclosures of which are hereby incorporated by reference in their entirety.

BACKGROUND

A financial instrument trading system, such as a futures exchange, referred to herein also as an "Exchange", such as the Chicago Mercantile Exchange Inc. (CME), provides a contract market where financial instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price.

Typically, the Exchange provides for a centralized "clearing house" through which all trades made must be confirmed, matched, and settled each day until offset or delivered. The clearing house is an adjunct to the Exchange, and may be an operating division of the Exchange, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the Clearing House.

Current financial instrument trading systems allow traders to submit orders and receive confirmations, market data, and other information electronically via a network. These "electronic" marketplaces are an alternative to pit based trading systems whereby the traders, or their representatives, all physically stand in a designated location, i.e. a trading pit, and trade with each other via oral and hand based communication. Anyone standing in or near the trading pit may be privy to the trades taking place, i.e. who is trading, what they are offering to trade (price and quantity), and what ultimately trades. Electronic trading systems attempt to replicate the trading pit environment in a marketplace of electronic form. In doing so, electronic trading systems ideally offer an efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

One manner in which electronic marketplaces attempt to achieve these goals is by equitably providing access to public market information, such as by efficiently disseminating public data, e.g. market data, prices, etc. or changes thereto, to all market participants, and by separating and restricting the communication of private data, e.g. orders and the responses thereto, from that public information. However, as more traders place more trades, the volume of data being communicated increases as well, increasing the burden on the communication infrastructure and supporting resources that are used to generate and transmit the communications in this manner

BRIEF DESCRIPTION OF THE DRAWINGS

FIG. 6 depicts an exemplary message structure for use with the disclosed embodiments.

DETAILED DESCRIPTION

Figure 1:
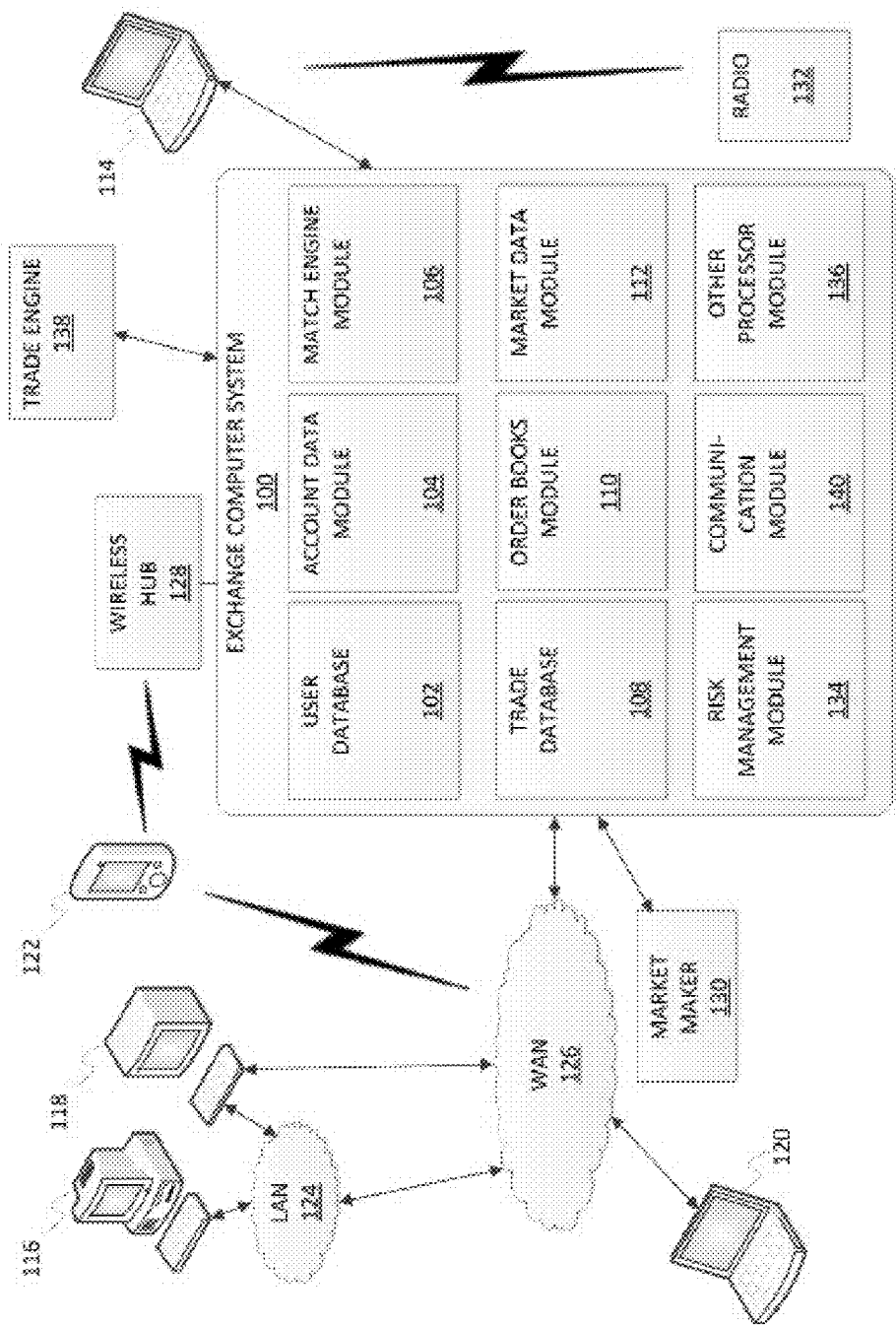
FIG. 1 depicts an illustrative computer network system that may be used to implement aspects of the disclosed embodiments.

The disclosed embodiments relate to communication of financial messages from an Exchange, such as the Chicago Mercantile Exchange ("CME"), to market participants whereby messages, or at least a portion of the content thereof, indicative of changes in the market, due to one or more trades between two or more market participants, are structured so as to reduce redundant data therein and prioritize the transmission of that portion of the message which summarizes the event and result thereof. Further, these event reporting messages may further consolidate, or otherwise be combined with, the corresponding directed reporting messages communicated to the particular market participants participating in the reported trade while preserving the anonymity of those market participants to which messages are particularly directed. In this way, redundant communications, as well as redundant data, may be eliminated, reducing the overall volume of data being communicated and the resources necessary in support thereof. In addition, inhibition of any one market participant intentionally or unintentionally influencing the market via exposure of their activities, or otherwise unfairly impinging on the exposed activities of other market participants, is maintained. Further, the consolidated messages, or at least the portion of each which relevant to all recipients, are equitably transmitted to all market participants substantially simultaneously over the same medium thereby minimizing or eliminating the occurrence of one market participant receiving market information ahead of the other market participants. It will be appreciated that the messages described herein may be received simultaneously by market participants, or temporally so close together as to be considered or perceived as being simultaneously received, for example. the difference in their time of receipt is too close to measure or otherwise discriminate among, also referred to as "substantially simultaneously".

While the disclosed embodiments may be discussed in relation to futures and/or options on futures trading, it will be appreciated that the disclosed embodiments may be applicable to any equity, options or futures trading system or market now available or later developed. It will be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trader orders, cancellation, etc., in a manner as expected by the market participants, such as based on market data, e.g. prices, available counter-orders, etc., to provide an expected level of certainty that transactions will occur in a consistent and predictable manner. In addition, it will be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participant are met, e.g. that predictable system responses are maintained.

As used herein, a financial message refers both to messages communicated by market participants to an electronic trading system and vice versa. Financial messages communicated to the electronic trading system, also referred to as "inbound" messages, may include request or order messages, such as trader orders, order modifications, order cancellations and the like, as well as other message types. Financial messages communicated from the electronic trading system, referred to as "outbound" messages, may include messages responsive to inbound messages, such as confirmation or acknowledgment messages, or other messages such as market update messages, quote messages, and the like.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. For example a request to place a trade may result in a response indicative of the trade either being matched with, or being rested on an order book to await, a suitable counter-order. This response may include a message directed solely to the trader who submitted to the order to acknowledge receipt of the order and report whether it was matched, and the extent thereto, or rested. The response may further include a message to all market participants reporting a change in the order book due to the order. This response may take the form of a report of the specific change to the order book, e.g. an order for quantity X at price Y was added to the book (referred to as a Market By Order message), or may simply report the result, e.g. price level Y is now has 5 orders for a total quantity if Z (where Z is the sum of the previous resting quantity plus quantity X of the new order) (referred to as a Market By Price message). In some cases, requests may elicit a non-impacting response, such as temporally proximate to the receipt of the request and then cause a separate market-impact reflecting response at a later time. For example, a stop order, fill or kill order, aka an immediate or cancel order, or other conditional request may not have an immediate market impacting effect, if at all, until the requisite conditions are met. Accordingly, an acknowledgement or confirmation of receipt, e.g. a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP" or Market By Order "MBO" format). It will be appreciated that additional conditions may be specified, such as a time or price limit, which may cause the order to be dropped or otherwise canceled and that such an event may result in another non-market-impacting communication instead. As will be described below, in some implementations market impacting communications may be communicated separately from non-market impacting communications, such as via a separate communications channel or feed. It will be further appreciated that various types of market data feeds may be provided which reflect different market or aspects thereof. Market participants may then, for example, subscribe to receive those feeds of interest to them. As market impacting communications tend to be more important to market participants then non impacting communications, this separation may reduce congestion and or noise among those communications having or reflecting an impact on a market or portion thereof. Furthermore, a particular market data feed may only communicate information related to the top buy/sell prices for a particular product, referred to as "top of book" feed, e.g. only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants. Generally, the disclosed embodiments relate to a restructuring of response messages reflecting market impacting events to reduce redundant data and convey more relevant information about the event to all market participants sooner than less relevant information so that the market participants may comprehend the event more quickly. Furthermore, the disclosed embodiments relate to consolidation of the communication of market impact reflecting response messages, e.g. responsive to inbound messages, with other market impact reflecting messages as will be described. In other implementations, these communications may or may not be further consolidated with non-market impacting messages.

Examples of the various types of market data feeds which may be provided by electronic trading systems, such as the CME, in order to provide different types or subsets of market information or to provide such information in different formats include Market By Order, Market Depth (aka Market by Price to a designated depth of the book), e.g. CME offers a 10-deep market by price feed, Top of Book (a single depth Market by Price feed), and combinations thereof. There may also be all manner of specialized feeds in terms of the content, i.e. providing, for example, derived data, such as a calculated index).

Market data feeds may be characterized as providing a "view" or "overview" of a given market, an aggregation or a portion thereof or changes thereto. For example, a market data feed, referred to as a Market By Price ("MBP") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g. only the top 10 resting buy/sell orders and, thereby, only provide a view of that portion. As used herein, a market impacting request may be said to impact the "view" of the market as presented via the market data feed. An MBP feed may utilize different message formats for conveying different types of market impacting events. For example, when a new order is rested on the order book, an MBP message may reflect the current state of the price level to which the order was added, e.g. the new aggregate quantity and the new aggregate number of resting orders. As can be seen, such a message conveys no information about the resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e. report the result of multiple market impacting events in a single message.

Alternatively, a market data feed, referred to as a Market By Order ("MBO") feed, may convey data reflecting a change that occurred to the order book rather than the result of that change, e.g. that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO messages carry much more data because they reflect any market impacting change. Furthermore, because specific orders, but not the submitting traders thereof, are identified, other market participants may be able to follow that order as it progresses through the market, e.g. as it is modified, canceled, traded, etc.

It will be appreciated that number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. As such, MBP and MBO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancelation, an order modification, etc., are fairly simple and compact and easily created and transmitted. However, messages, whether MBO or MBP, generated response to market impacting events which are caused by more than one order, such as a trade, may require the transmission of a significant amount of data to convey the requisite information to the market participants. For trades involving a large number of orders, e.g. a buy order for a quantity of 5000 which matches 5000 sell orders each for a quantity of 1, a significant amount of information may need to be sent, e.g. data indicative of each of the 5000 trades that have participated in the market impacting event.

Figure 5:
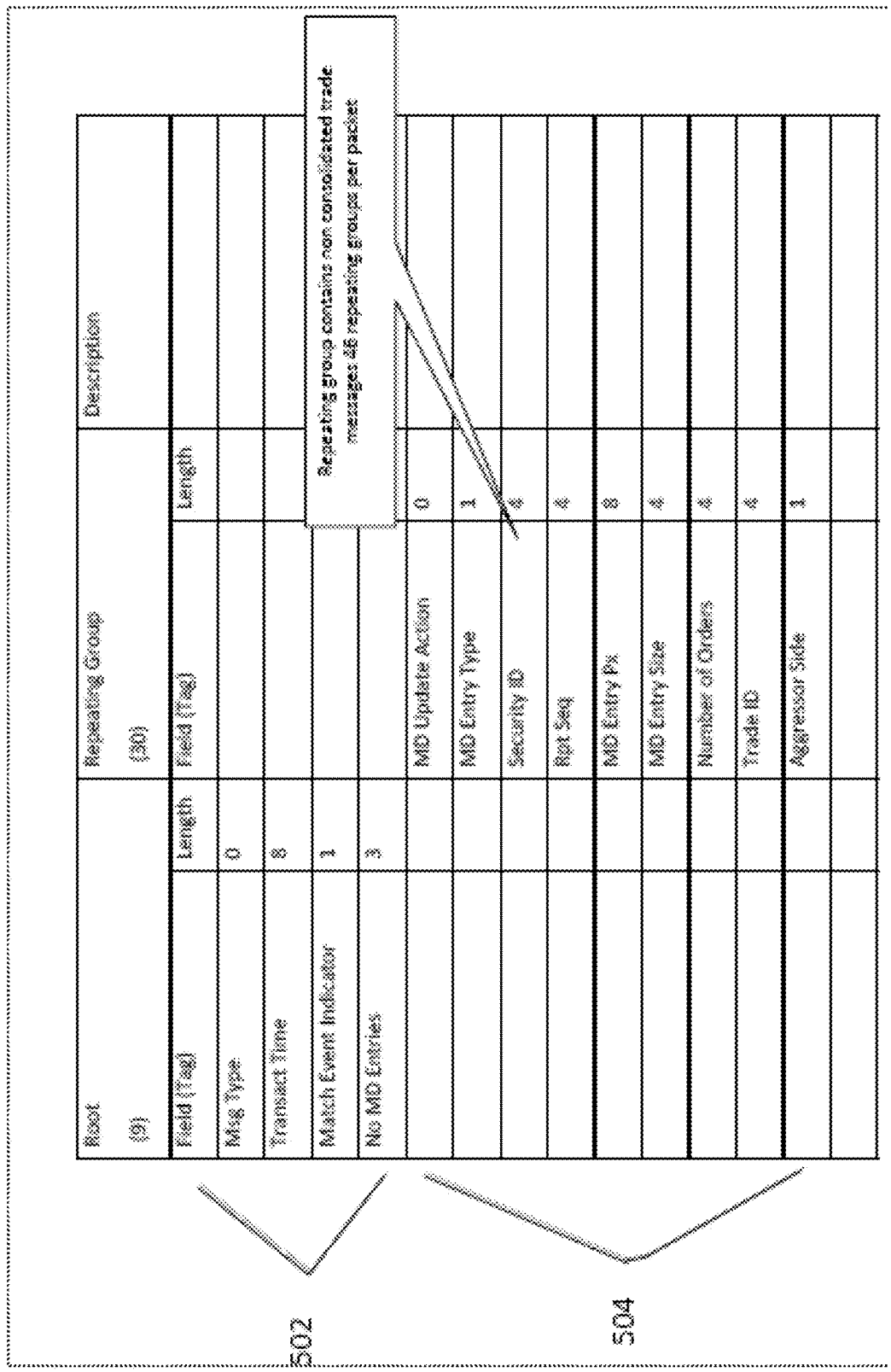
FIG. 5 depicts an exemplary message structure.

Referring to FIG. 5, there is shown a message format for an MBP message for reporting a trade. The format calls for a header portion 502 and a set of nine trade data fields 504, each set accounting for 30 bytes. The header portion 502 include a message type ("MSG Type"), Transaction Time, Match Event Indicator, and Number of Market Data Entries ("No. MD Entries") fields. The trade data fields 504 include a Market Data Update Action indicator ("MD Update Action"), a Market Data Entry Type indicator ("MD Entry Type"), an identifier of the instrument/security ("Security ID") being transacted, a Report Sequence identifier ("Rpt Seq"), the price associated with the transaction ("MD entry Px"), the quantity transacted ("MS Entry Size"), the number of orders involved in the trade ("Number of Order"), a trade identifier ("Trade ID"), and an identifier of the aggressor side ("Aggressor Side"). The nine trade data fields 504 are included for each participating trade so, for the example above, there would be 5000 sets of these nine fields, each with data for one of the 5000 participating trades, or 150,000 bytes. Since all of this data may exceed the capacity of data packet used to convey messages over a network, the MBP message may need to be split into multiple packets separately transmitted via the network to the market participants. For a recipient market participant to be able to comprehend the market impacting event which occurred, they would have to wait to receive all of the packets which comprise the message which may impart delay on the ability of that market participant to respond to the event, especially in a volatile market.

Furthermore, each participating trader needs to receive a notification that their particular order has traded. Continuing with the example, this would require sending 5001 individual trade notification messages in addition to the notification sent to all of the market participants.

The disclosed embodiments recognize that trade notifications sent to all market participants may include redundant information repeated for each participating trade. Referring to FIG. 6, there is shown a structure 600 of an MBP trade notification message which results in a more efficient communication of the occurrence of a trade. The message structure 600 includes a header portion which indicates the type of transaction which occurred, i.e. a trade, as well as other general information about the event, an instrument portion which comprises data about each instrument which was traded as part of the transaction, and an order portion which comprises data about each participating order. In one embodiment, the header portion 602 includes a message type ("MSG Type"), Transaction Time, Match Event Indicator, and Number of Market Data Entries ("No. MD Entries") fields. The instrument portion 604 include a market data update action indicator ("MD Update Action"), an indication of the Market Data Entry Type ("MD Entry Type"), an identifier of the instrument/security involved in the transaction ("Security ID"), a report sequence indicator ("Rpt Seq"), the price at which the instrument was traded ("MD Entry PX"), the aggregate quantity traded at the indicated price ("ConsTradeQty"), the number of participating orders ("NumberOfOrders"), and an identifier of the aggressor side ("Aggressor Side") fields. The order portion 606 includes, in one embodiment, an identifier of the participating order ("Order ID"), and the quantity of the order traded ("MD Entry Size") fields. It will be appreciated that the particular fields included in each portion are implementation dependent and that different fields in addition to, or in lieu of, those listed may be included depending upon the implementation. It will be appreciated that the exemplary fields are compliant with the FIX binary and/or FIX/FAST protocol for the communication of the financial information.

The instrument portion contains a set of fields, e.g. seven fields accounting for 23 bytes, which are repeated for each participating instrument. In complex trades, such as trades involving combination orders or strategies, e.g. spreads, or implied trades, there may be multiple instruments being exchanged among the parties. In one embodiment, the order portion includes only one field, accounting for 4 bytes, for each participating order which indicates the quantity of that order which was traded. As will be discussed below, the order portion may further include an identifier of each order, accounting for an additional 8 bytes, in addition to the quantity thereof traded. As will be appreciated, data which would have been repeated for each participating order, is consolidated or otherwise summarized in the header and instrument portions of the message thereby eliminating redundant information and, overall, significantly reducing the size of the message.

For example, for a simple trade of a single instrument as the result of a single buy order and single sell order, the message structure 500 of FIG. 5 would require 18 fields of data (not including the header) or 60 bytes whereas the message structure 600 of FIG. 6, according to one embodiment without order ID, would require 10 fields of data (not including the header) for a total of 31 bytes. Assuming the buy order was for quantity 100 and was matched to 100 sell orders each for quantity 1, the message structure 500 of FIG. 5 would require 909 fields of data (27,270 bytes) whereas the message structure 600 of FIG. 6 would require 109 fields of data (426 bytes without order ID, 1235 bytes with order id). With respect to the message structure 500 of FIG. 5, in one implementation only 46 repeating fields sets 504 would fit in a single data packet necessitating the transmission of over 20 data packets to convey the entire message. With respect to the message structure 600 of FIG. 6, in one implementation, 62 repeating fields sets for the instrument portion 604 and 116 repeating field sets for the order portion 606 may fit within a data packet allowing the entire exemplary message to be sent in a single data packet.

As shown in FIGS. 5 and 6, the field length is the length of the data field in number of bytes. A field length of 0 indicates that neither the field nor any data therefore is actually transmitted but per the communications protocol, e.g. FIX binary or FIX/FAST, is assumed by both the sender and receiver to be present and have a particular value per the communications protocol. For convenience, the foregoing examples, compared the amount of transmitted data for each message structure based on the number of fields of data transmitted and assuming all fields were transmitted. However, the byte counts reflect that some fields are not actually transmitted.

In an alternative embodiment, the message structure 600 of FIG. 6 may further include an order identifier for each order listed in the order portion 606. In one embodiment the order identifier is a host order number ("HON") but it will be appreciated that the identifier may be any identifier which uniquely identifies the order. By providing the order identifier in the MBP message, the participating traders may be notified that it was their orders which were filled. This would eliminate the need for separately transmitted acknowledgment messages transmitted to each participating trader, greatly reducing the bandwidth of privately transmitted data. As only the participating trader would recognize the order identifier, anonymity is effectively preserved. Furthermore, in implementations using only MBP data feeds, the ability of other market participants to follow the progress of orders using the order identifier is greatly diminished as the data presented in the exemplary MBP message structure only conveys a portion of the progress of the particular order, e.g. the particular quantity which actually traded but not the quantity of the original order or any modifications thereto, etc.

It will be appreciated that adding the order identifier to the message structure 500 of FIG. 5 may introduce a disparity in the dissemination of trade information for large trades requiring a multi-data packet message by allowing participating traders whose orders are indicated in an earlier transmitted packet to learn of their participation sooner than a trader whose orders are indicated in a later transmitted packet. The message structure 600 of FIG. 6 mitigates this problem by reducing the number of packets which may be required to send a given message and thereby compressing the gap between individual trader notifications. In an alternative embodiment, the content of each message packet may be encrypted with the last message packet including the key for decrypting the previously sent packets of the message. This would effectively prevent the recipients from viewing the message content until all packets have been received, effectively normalizing the availability of the message content among all of the recipients. More information about this implementation may be found in U.S. patent application Ser. No. 14/100,887, filed contemporaneously herewith now U.S. Patent Application Publication No. 2015/0088723, the entire disclosure of which is hereby incorporated by reference.

While the disclosed embodiments will be discussed with respect to an MBP market data feed, it will be appreciated that the disclosed embodiments may also be applicable to an MBO market data feed.

Figure 7:
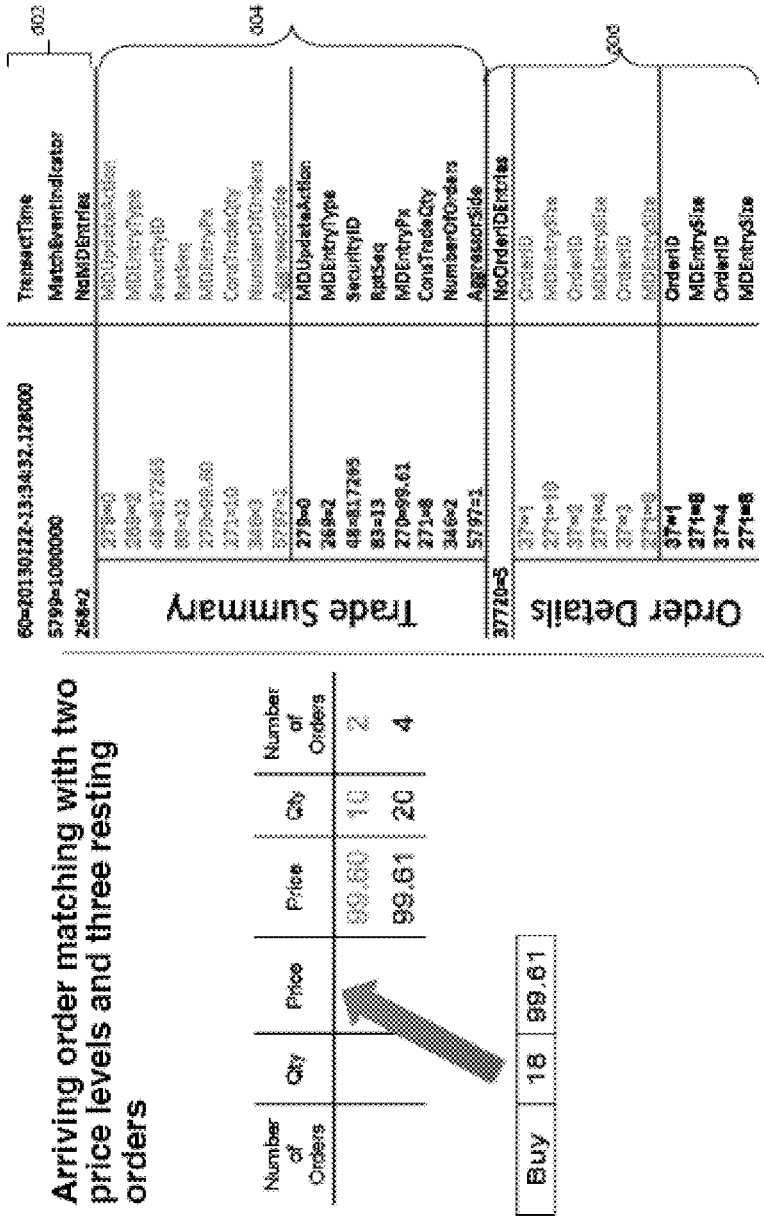
FIG. 7 depicts an exemplary financial message structured in accordance with the message structure of FIG. 6.

An exemplary financial message in accordance with the message structure 600 of FIG. 6 is shown in FIG. 7.

Figure 4:
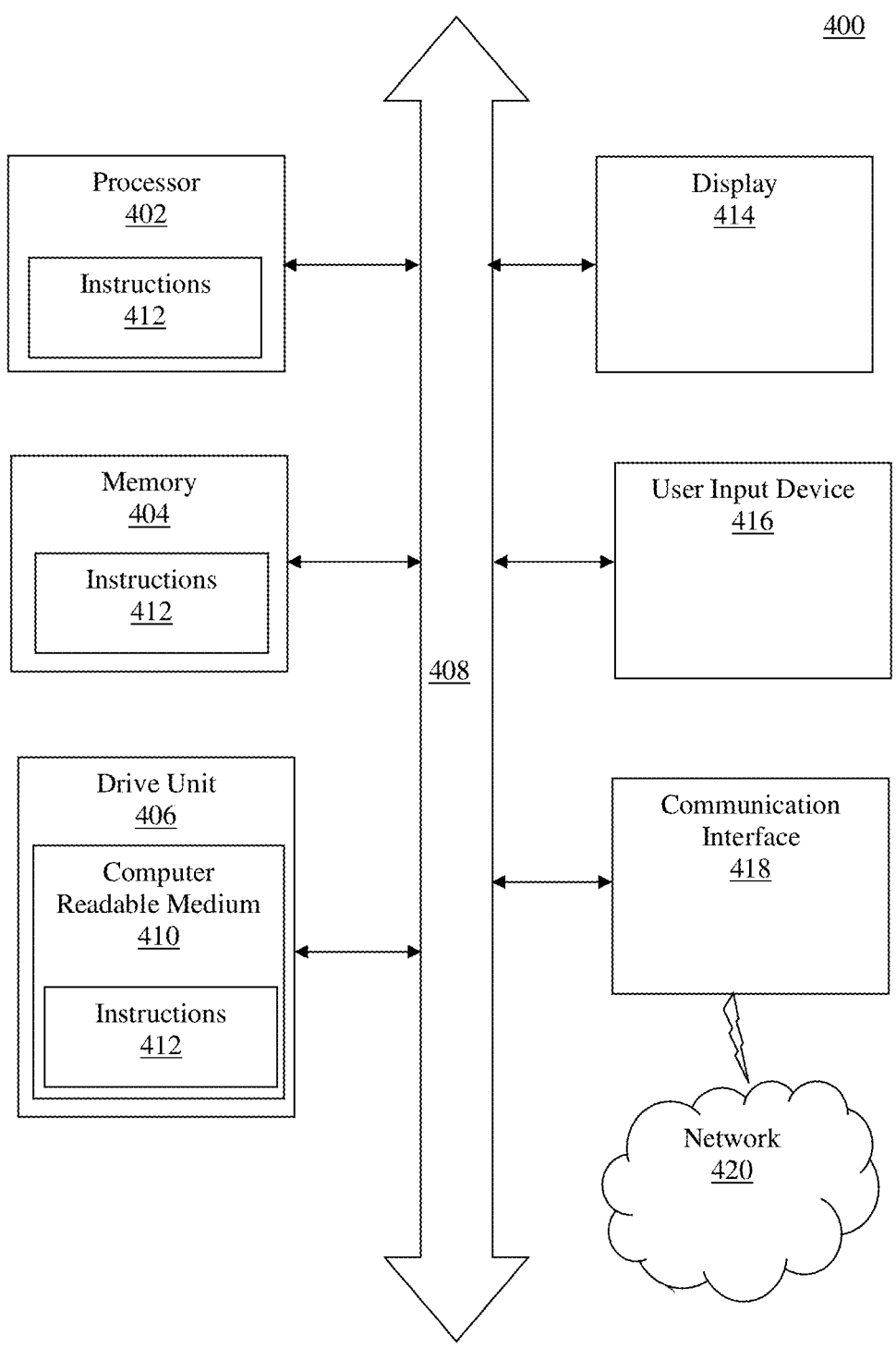
FIG. 4 shows an illustrative embodiment of a general computer system for use with the system of FIGS. 1 and 2.

In accordance with aspects of the disclosure, systems and methods are disclosed for generating financial messages in accordance therewith The disclosed embodiments are preferably implemented with computer devices and computer networks, such as those described with respect FIG. 4, that allow users, e.g. market participants, to exchange trading information. It will be appreciated that the plurality of entities utilizing the disclosed embodiments, e.g. the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange. An exemplary trading network environment for implementing trading systems and methods is shown in FIG. 1. An exchange computer system 100 receives orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the computer 400 described below with respect to FIG. 4. A user database 102 may be provided which includes information identifying traders and other users of exchange computer system 100, such as account numbers or identifiers, user names and passwords. An account data module 104 may be provided which may process account information that may be used during trades. A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by the order book module 110 and/or match engine module 106. A volume control module 140 may be included to, among other things, control the rate of acceptance of mass quote messages in accordance with one or more aspects of the disclosed embodiments. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g. send and receive, trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 420 shown in FIG. 4 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g. star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As was described above, the users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may include computer-executable instructions for receiving order information from a user and transmitting that order information to exchange computer system 100. In another example, the exemplary computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Figure 2:
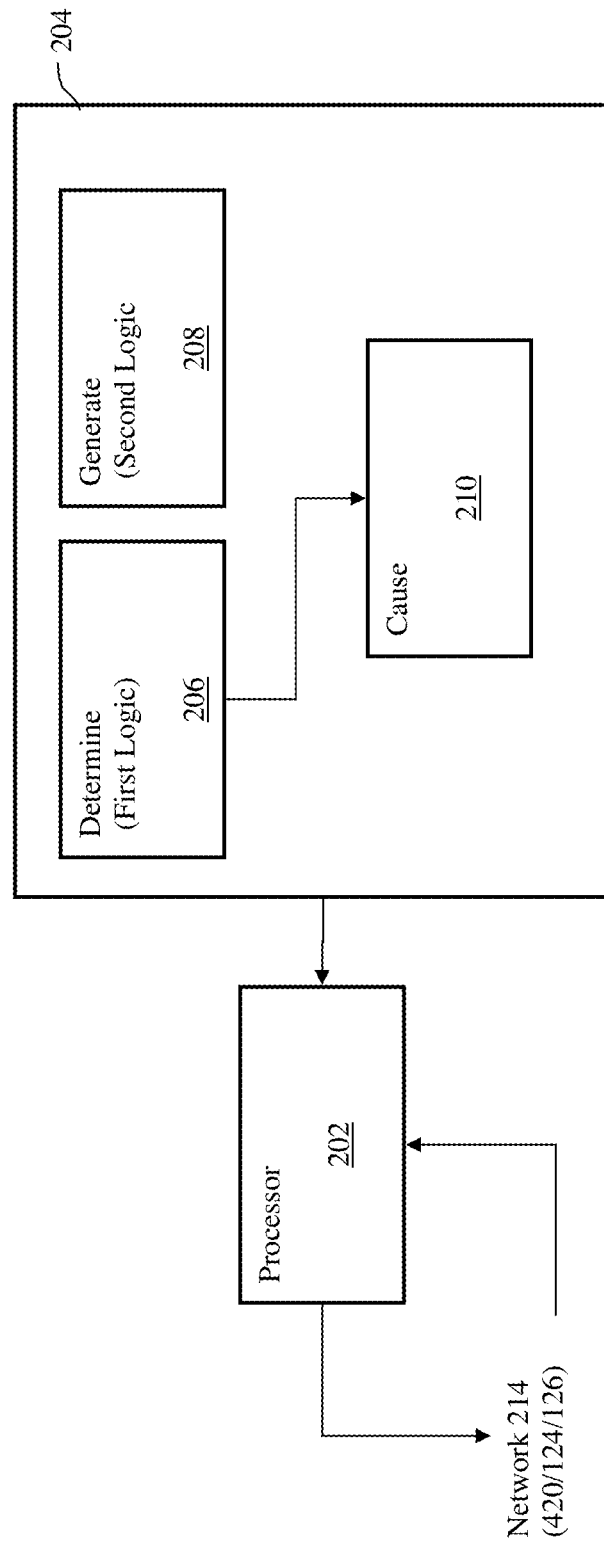
FIG. 2 a block diagram of an exemplary implementation of the system of FIG. 1 for managing communications of financial messages.

As shown in FIG. 1, the Exchange computer system 100 includes a market data module 112 which may implement the disclosed mechanisms as will be describe with reference to FIG. 2. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

FIG. 2 depicts a block diagram of a market data module 112 according to one embodiment, which in an exemplary implementation, is implemented as part of the exchange computer system 100 described above. As used herein, an exchange 100 includes a place or system that receives and/or executes orders. In particular, FIG. 2 shows a system 200 for efficient management of reporting or otherwise communication, such as via a network 214, to a plurality of market participant of data indicative of a change in state of an electronic marketplace, e.g. an order book, for one or more financial products. The reporting/communications may be in the form of one or more financial messages communicated to the plurality of market participants via the network 214 which, as described above, may be the network 420 described below or network 124 or 126 described above, which may be implemented as a market data module 112 as described above. It will be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g. the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entirety. Further, the disclosed messages may be delivered by an open message standard implementation, such as FIX or FIX/FAST, or by an Exchange-provided API.

The system 200 includes a processor 202 and a memory 204 coupled therewith which may be implemented a processor 402 and memory 404 as described below with respect to FIG. 4. The system 200 further includes a transaction processor which may be implemented as a separate hardware component or as first logic 206 stored in the memory 204 and executable by the processor 202 to cause the processor 202 to determine, such as by communicating with a match engine 106, that one or more attempts to match one or more incoming orders received from one or more of the plurality of market participants, each of which may specify a side (buy or sell), quantity, price and instrument, for at least one transaction for the one or more financial products with at least one previously received but unsatisfied order for a transaction counter thereto resulted, i.e. traded, in at least partial satisfaction, i.e., fill or partial fill, of one or both of the incoming order or the at least one other previously received order.

The system 200 further includes a message generator coupled with the transaction processor, which may be implemented as second logic 208 stored in the memory 204 and executable by the processor 202 to cause the processor to generate, based on the determination that one or both of the incoming order(s) or the at least one other previously received order were at least partially satisfied, a reporting message comprising a first portion 604 and a second portion 606, wherein the first portion 604 comprises first data identifying each of the one or more financial products transacted, i.e. the participating or contributing trades, as a result of the at least partial satisfaction of one or both of the incoming order or the at least one previously received but unsatisfied order, and the second portion 606 comprises second data enumerating each of the incoming order and at least one previously received but unsatisfied orders that were at least partially satisfied, wherein the message generator may further be comprised of third logic 210 stored in the memory 204 and executable by the processor 202 to cause the processor 202 to cause the first portion 604 to be communicated to the plurality of market participants prior to the second portion 606. In one embodiment, the reporting message may be communicated, i.e. to the plurality of market participants, via one or more transmissions, e.g. data packets.

As was described above, redundant data regarding each participating order is non-redundantly provided in first portion 604 which reduces the overall message size and, via the provisioning of this portion prior to the second portion, may ensure that receiving market participants acquire this information sooner. In one embodiment, the first and second portions 604 606 may be structured, i.e. include data fields, as depicted in FIG. 6. However, it will be appreciated that the particular fields of data included in each portion 604 606 are implementation dependent and may vary based thereon.

In one embodiment, the transaction processor/first logic 206 may be further operative to determine a resultant state of the electronic marketplace due to the at least partial satisfaction of one or both of the incoming order or at least one previous received but unsatisfied order, wherein the first portion 604 of the reporting message further comprises data indicative of the determined resultant state. For example, the reporting message may be of the MBP format.

In one embodiment, the transaction processor/first logic 206 may be further operative to determine a change in the state of the electronic marketplace due to the at least partial satisfaction of one or both of the incoming order or at least one previous received but unsatisfied order, wherein the first portion further comprises data indicative of the determined change. For example, the reporting message may be of the MBO format.

In one embodiment, the first data may further indicate aggregate transacted quantity and transaction price of each of the one or more financial products transacted as a result of the at least partial satisfaction of one or both of the incoming order or the at least one previously received but unsatisfied order.

In one embodiment, the second data further indicate a quantity of each of the incoming order and at least one previously received but unsatisfied orders that was satisfied. Further, the second data may exclude any information regarding the original order quantity or pre-trade modifications such that only the submitting trader may appreciate the progress of the order and the extent to which it has been traded/filled.

In one embodiment, the second data may further identify, such as by using an HON or order-unique identifier, each of the incoming order and at least one previously received but unsatisfied orders that were at least partially satisfied such that a submitting market participant thereof may determine that their order has been at least partially satisfied. Further, in this embodiment, the system 200 may be further operative to not transmit a message acknowledging the at least partial satisfaction of an order solely to the submitting market participant thereof.

In one embodiment, the first data includes order data related to one or more of the enumerated incoming order and at least one previously received but unsatisfied orders that were at least partially satisfied, the order data not being included in the second data. In this manner, redundant data is removed to reduce the overall message size as was described above In one embodiment, upon receipt of at least the first portion of the reporting message, a receiving market participant may comprehend the entire change in state of the electronic marketplace due to the at least partial satisfaction of one or both of the incoming order or the at least one other previously received order.

In one embodiment, the reporting message may further include a third portion 602 comprising third data operative to distinguish the reporting message from other messages indicative of market events other than the at least partial satisfaction of one or both of an incoming order or at least one other previously received order, the third portion being communicated prior to the first portion.

Figure 3:
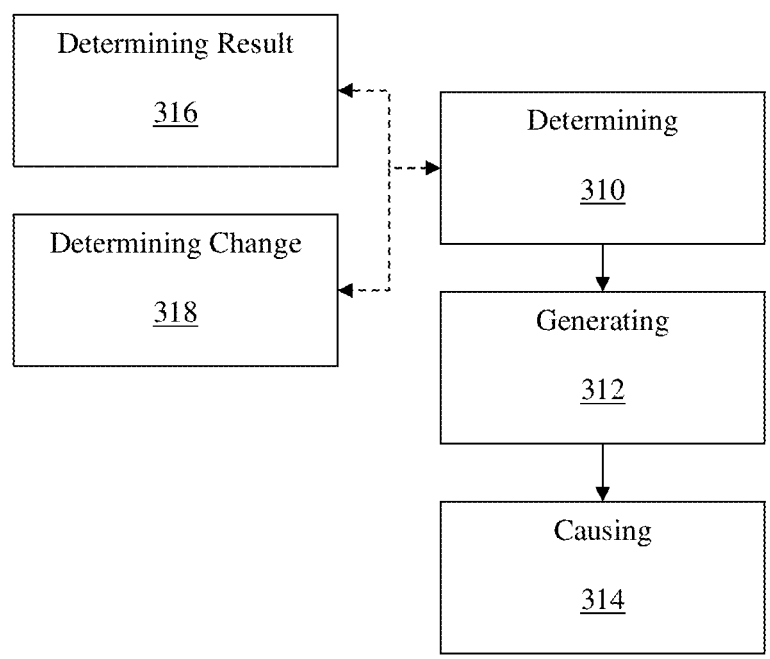
FIG. 3 depicts a flow chart showing operation of the system of FIGS. 1 and 2.

FIG. 3 depicts a flow chart showing operation of the system 200 of FIG. 2. In particular FIG. 3 shows a computer implemented method for efficiently managing reporting to a plurality of market participants of data indicative of a change in state of an electronic marketplace, e.g. an order book, for one or more financial products.

The operation of the system 200 includes determining, by a processor 202, such as based on the output of one or more match engines 106, that at least one attempt to match at least one incoming order received from one or more of the plurality of market participants, specifying side (buy/sell), quantity, price and instrument, for at least one transaction for the one or more financial products with at least one previously received but unsatisfied order for a transaction counter thereto resulted in at least partial satisfaction of one or both of the incoming order or the at least one other previously received order, e.g. traded (Block 310).

The operation of the system 200 further includes generating, by the processor 202 based on the determination that one or both of the incoming order(s) or the at least one other previously received order were at least partially satisfied, a reporting message comprising a first portion 604 and a second portion 606, wherein the first portion 604 comprises first data identifying each of the one or more financial products transacted, e.g. the participating/contributing trades, as a result of the at least partial satisfaction of one or both of the incoming order or the at least one previously received but unsatisfied order, and the second portion 606 comprises second data enumerating each of the incoming order and at least one previously received but unsatisfied orders that were at least partially satisfied (Block 312).

The operation of the system 200 further includes causing, by the processor 202, the first portion 604 to be communicated to the plurality of market participants prior to the second portion 606, e.g. in one or more transmissions, i.e. one or more data packets (Block 314).

In one embodiment, the operation of the system 200 further includes determining, by the processor, a resultant state of the electronic marketplace due to the at least partial satisfaction of one or both of the incoming order or at least one previous received but unsatisfied order, wherein the first portion 604 further comprises data indicative of the determined resultant state, e.g. the reporting message is of the MBP format (Block 316).

In one embodiment, the operation of the system 200 further includes determining, by the processor, a change in the state of the electronic marketplace due to the at least partial satisfaction of one or both of the incoming order or at least one previous received but unsatisfied order, wherein the first portion 604 further comprises data indicative of the determined change, e.g. the reporting message is of the MBP format (Block 318).

In one embodiment, the first data further indicates aggregate transacted quantity and transaction price of each of the one or more financial products transacted as a result of the at least partial satisfaction of one or both of the incoming order or the at least one previously received but unsatisfied order.

In one embodiment, the first data may further indicate aggregate transacted quantity and transaction price of each of the one or more financial products transacted as a result of the at least partial satisfaction of one or both of the incoming order or the at least one previously received but unsatisfied order.

In one embodiment, the second data further indicate a quantity of each of the incoming order and at least one previously received but unsatisfied orders that was satisfied. Further, the second data may exclude any information regarding the original order quantity or pre-trade modifications such that only the submitting trader may appreciate the progress of the order and the extent to which it has been traded/filled.

In one embodiment, the second data may further identify, such as by using an HON or order-unique identifier, each of the incoming order and at least one previously received but unsatisfied orders that were at least partially satisfied such that a submitting market participant thereof may determine that their order has been at least partially satisfied. Further, in this embodiment, the system 200 may be further operative to not transmit a message acknowledging the at least partial satisfaction of an order solely to the submitting market participant thereof.

In one embodiment, the first data includes order data related to one or more of the enumerated incoming order and at least one previously received but unsatisfied orders that were at least partially satisfied, the order data not being included in the second data. In this manner, redundant data is removed to reduce the overall message size as was described above In one embodiment, upon receipt of at least the first portion of the reporting message, a receiving market participant may comprehend the entire change in state of the electronic marketplace due to the at least partial satisfaction of one or both of the incoming order or the at least one other previously received order.

In one embodiment, the reporting message may further include a third portion 602 comprising third data operative to distinguish the reporting message from other messages indicative of market events other than the at least partial satisfaction of one or both of an incoming order or at least one other previously received order, the third portion being communicated prior to the first portion.

One skilled in the art will appreciate that one or more modules described herein may be implemented using, among other things, a tangible computer-readable medium comprising computer-executable instructions (e.g., executable software code). Alternatively, modules may be implemented as software code, firmware code, hardware, and/or a combination of the aforementioned. For example the modules may be embodied as part of an exchange 100 for financial instruments.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above, such as the processor 202, may be a computer system 400 or a component in the computer system 400. The computer system 400 may implement a match engine, margin processing, payment or clearing function on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A system including:
 a transaction processor configured to determine a change in a state of a database as a result of a plurality of requests received from a plurality of sources;
 a message generator configured to generate a change message including a notification portion and a request data portion, wherein the notification portion includes notification data conveying the change in the state of the database without identifying all of the plurality of requests and the request data portion includes request data identifying at least one of the plurality of requests, and wherein the request data included in the request data portion is not included in the notification portion; and
 a message transmitter configured to:
  transmit the notification portion of the change message to a plurality of recipients prior to transmission of the request data portion, wherein receipt of only the notification portion by any of the plurality of recipients informs the recipient of the change in the state of the database; and
  transmit, after transmission of the notification portion, the request data portion to the plurality of recipients as a plurality of packets, the plurality of packets including:
   an encrypted packet including at least a part of the request data portion; and
   a last packet including a decryption key to decrypt the encrypted packet, wherein transmission of the last packet is timed to shorten a period of time between individual updates to each of the plurality of recipients by delaying access to the request data portion for some of the plurality of recipients.

2. The system of claim 1, wherein the request data includes data that allows, upon receipt of the request data portion, a submitting participant of a previously received but unsatisfied request to determine that their request has been at least partially satisfied.

3. The system of claim 1, wherein the request data includes a request-unique identifier for each of the plurality of requests that were at least partially satisfied.

4. The system of claim 3, wherein the request data further includes a quantity for each of the plurality of requests that were at least partially satisfied.

5. The system of claim 1, wherein the request data excludes any information regarding an incoming request quantity or a pre-trade modification to allow only a submitting participant of a corresponding incoming request to comprehend an extent to which the incoming request is satisfied.

6. The system of claim 1, wherein the message transmitter is further operative to not transmit an individualized message acknowledging the at least partial satisfaction of a previously received but unsatisfied request solely to a submitting participant thereof.

7. The system of claim 1, wherein the notification data includes at least a count of ones of the plurality of requests that were at least partially satisfied.

8. The system of claim 1, wherein the notification data further indicates aggregate transacted quantity and transaction price of each of one or more financial products transacted as a result of an at least partial satisfaction of an incoming request a previously received but unsatisfied request.

9. The system of claim 1, wherein the notification portion further includes data relating to a result of a plurality changes in the state of the database.

10. The system of claim 1, wherein the database includes an electronic order book that implements an electronic marketplace.

11. A method including:
 determining, by a processor a change in a state of a database as a result of plurality of requests received from one or more sources;
 generating, by the processor, a message including a notification portion and a request data portion, wherein the notification portion includes notification data conveying the change in the state of the database without identifying all of the plurality of requests and the request data portion includes request data identifying at least one of the plurality of requests, and wherein the request data included in the request data portion is not included in the notification portion;
 transmitting the notification portion of the message to a plurality of recipients prior to transmitting the request data portion, wherein receipt of only the notification portion by any of the plurality of recipients informs the recipient of the change in the state of the database; and
 transmitting, after transmitting the notification portion, the request data portion to the plurality of recipients as a plurality of packets, the plurality of packets including:
  an encrypted packet including at least a part of the request data portion; and
  a last packet including a decryption key to decrypt the encrypted packet, wherein transmission of the last packet is timed to shorten a period of time between individual updates to each of the plurality of recipients by delaying access to the request data portion for some of the plurality of recipients.

12. The method of claim 11, wherein the request data includes data that allows, upon receipt of the request data portion, a submitting participant of a previously received but unsatisfied request to determine that their request has been at least partially satisfied.

13. The method of claim 11, wherein the request data includes a request-unique identifier for each of the plurality of requests that were at least partially satisfied.

14. The method of claim 13, wherein the request data further includes a quantity for each of the plurality of requests that were at least partially satisfied.

15. The method of claim 11, wherein the request data excludes any information regarding an incoming request quantity or a pre-trade modification to allow only a submitting participant of a corresponding incoming request to comprehend an extent to which the incoming request is satisfied.

16. The method of claim 11, wherein the notification data includes at least a count of ones of the plurality of requests that were at least partially satisfied.

17. The method of claim 11, wherein the notification data further indicates aggregate transacted quantity and transaction price of each of one or more financial products transacted as a result of an at least partial satisfaction of an incoming request a previously received but unsatisfied request.

18. The method of claim 11, wherein the notification portion further includes data relating to a result of a plurality of changes in the state of the database.

19. The method of claim 11, wherein the database includes an electronic order book that implements an electronic marketplace.

20. A system including:

means for determining a change in a state of a database as a result of plurality of requests received from one or more sources;

means for generating a message including a notification portion and a request data portion, wherein the notification portion includes notification data conveying the change in the state of the database without identifying all of the plurality of requests and the request data portion includes request data identifying at least one of the plurality of requests, and wherein the request data included in the request data portion is not included in the notification portion;

means for transmitting the notification portion of the message to a plurality of recipients prior to transmission of the request data portion, wherein receipt of only the notification portion by any of the plurality of recipients informs the recipient of the change in the state of the database; and means for transmitting, after transmitting the notification portion, the request data portion to the plurality of recipients as a plurality of packets, the plurality of packets including:
  an encrypted packet including at least a part of the request data portion; and
  a last packet including a decryption key to decrypt the encrypted packet, wherein transmission of the last packet is timed to shorten a period of time between individual updates to each of the plurality of recipients by delaying access to the request data portion for some of the plurality of recipients.

* * * * *